Apr. 24, 1923.
B. D. HOBSON
1,453,011
DEVICE FOR EXTRICATING MUD STALLED VEHICLES
Filed June 15, 1922
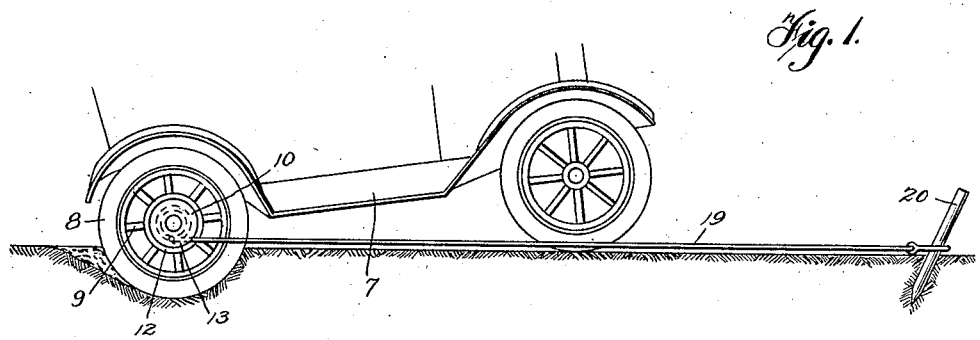
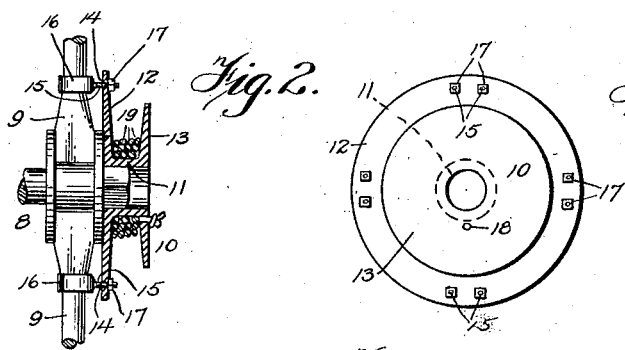
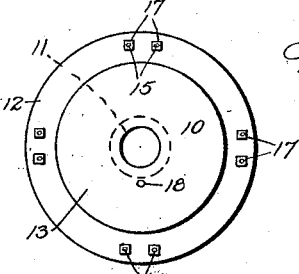
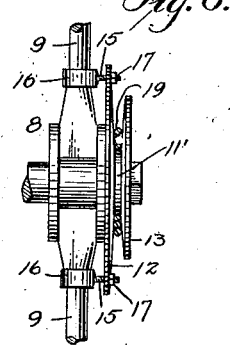
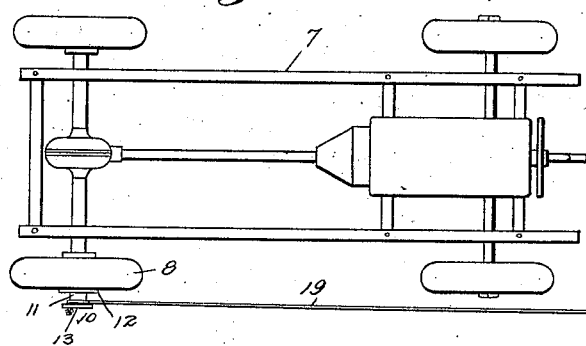
Inventor
Bennett D. Hobson.
By Frank H. Borden
Attorney Patented Apr. 24, 1923.

1,453,011

UNITED STATES PATENT OFFICE.

BENNETT D. HOBSON, OF RICHMOND, VIRGINIA.

DEVICE FOR EXTRICATING MUD-STALLED VEHICLES.

Application filed June 15, 1922. Serial No. 568,609.

*To all whom it may concern:*

Be it known that I, BENNETT D. HOBSON, a citizen of the United States, residing at Richmond, in the county of Henrico and State of Virginia, have invented certain new and useful Improvements in Devices for Extricating Mud-Stalled Vehicles, of which the following is a specification.

My invention relates to improvements in devices for extricating mud-stalled vehicles.

Several devices for this purpose have been developed but as far as known those at present before the public have several disadvantages, which my invention is believed to obviate.

It is an object of my invention to provide a readily detachable towing or traction device, which can be easily and quickly assembled, and disassembled, and is of such proportion and construction as to be readily disposed under the seat of a vehicle.

As the resistance to movement of a stalled vehicle is greatest when the first impulse to move is given, and decreases as momentum is gained, it is another object of my invention to provide a device of this character in which the greatest pulling power is developed at the beginning of the extricating movement, which steadily decreases as the vehicle gains momentum.

In carrying out my invention I provide a grooved drum or pully, preferably of such width of groove as to receive a single width or thickness of cable, a cable affixed to the drum in position to be reeled thereon, an anchor for the cable, and means for detachably connecting the drum to a wheel of a vehicle.

In the accompanying drawings, forming part of this application:

Fig. 1, is a side elevation of a portion of a motor vehicle with the cable and drum in position, a rear wheel being shown as in a hole in the road, Fig. 2, is a vertical section of the drum in position on a wheel, of which the hub is shown in full lines, Fig. 3, is a front view of the drum, Fig. 4, is a top plan of the chassis of a vehicle with the drum and cable in position on a wheel thereof, Fig. 5, is a detail of the connection between the drum and a spoke of the wheel, and Fig. 6, is a vertical section similar to Fig. 2, showing the preferred form of drum.

The vehicle 7 has a power wheel 8, to the spokes 9 of which the drum 10 is affixed, when the wheel has gotten into a mud hole or other obstacle to its progress.

The drum 10 comprises a single casting, having a hub 11, and radial flanges 12 and 13. The inner flange is preferably of the greater diameter, and has a series of pairs of holes or openings 14, through which the bolt ends or shanks 15 of the U-clamps 16 extend.

It will be seen that the U-clamps engage the spokes 9, and the shanks thereof extend through the openings 14, and are held in a firm position by nuts 17.

Of advantage in this connection is the different diameters of the flanges, permitting ready access to the nuts and bolt ends.

The smaller flange has a single opening 18 in its face adjacent the hub for the purpose of anchoring one end of the cable 19 to the drum. The other end of the cable is provided with a stake or other anchor 20. When in position this forms a stationary object with respect to which the vehicle moves.

In the preferred form of drum 11' the flanges are rather close together so that but a single thickness of cable can be received.

The operation of the device is quite apparent and is as follows: Upon the vehicle sinking into a mud hole or snow bank or other obstruction to its progress, the operator removes the drum with the cable reeled thereon from under the seat or other place in which it is to be kept, places the clamps in position upon the spokes of the wheel, engages the drum with the clamps, drives the stake into the ground at a desired point, then starts the wheel rotating, by the application of power from the engine.

As the wheel rotates the cable is wound up upon the drum and the vehicle pulled forward out of the hole.

The resistance to movement is greatest at the very inception of the movement, and by my device the greatest power is developed at that moment. This is due to the width of the groove and and the diameter of the hub. As the cable is reeled upon the hub however, the effective diameter of the hub of the drum is increased, and consequently, with the same power available at the wheel, the speed of movement of the vehicle increases. It is thought that this will be apparent.

I claim as my invention:

The combination with a vehicle, of a power wheel carried thereby, of a drum removably engaging the wheel and a cable engaging the drum, said drum having a hub and a pair of flanges spaced to receive but a single thickness of cable, the whole so arranged that when the vehicle is stalled and its resistance to movement is greatest, turning the power wheel and drum at a given expenditure of power exerts the greatest pull on the cable, and that as the vehicle moves and attains momentum, the effective diameter of the drum becomes increasingly greater and the vehicle speed of movement becomes increasingly greater with the same expenditure of power.

In testimony whereof I affix my signature.

BENNETT D. HOBSON.